United States Patent [19]
Kozan et al.

[11] Patent Number: 6,110,071
[45] Date of Patent: Aug. 29, 2000

[54] ELECTRONIC TRANSMISSION RANGE SELECTION

[75] Inventors: Michael Andrew Kozan, Canton; Roger D. Combs; Steve P. Gunn, both of Plymouth, all of Mich.

[73] Assignee: General Motors Corporation, Detroit, Mich.

[21] Appl. No.: 09/302,506

[22] Filed: Apr. 30, 1999

[51] Int. Cl.[7] .............................. F16H 61/04; F16D 11/06
[52] U.S. Cl. .............................................. 477/143; 192/51
[58] Field of Search ................................ 477/86, 156, 143, 477/174, 92, 201; 192/87.18, 51

[56] References Cited

U.S. PATENT DOCUMENTS

| | | | |
|---|---|---|---|
| 3,581,852 | 6/1971 | Griffen | 477/102 |
| 5,203,616 | 4/1993 | Johnson | 477/201 X |
| 5,228,365 | 7/1993 | Koenig et al. | 74/866 |
| 5,437,204 | 8/1995 | Person | 477/125 X |
| 5,622,080 | 4/1997 | Furukawa | 477/125 X |
| 5,630,489 | 5/1997 | Bebernes | 192/219.4 |
| 5,704,693 | 1/1998 | Mackiewicz | 303/3 |
| 5,992,599 | 11/1999 | Hallenstvedt et al. | 192/51 X |
| 6,030,317 | 2/2000 | Konig et al. | 477/143 |

*Primary Examiner*—Khoi Q. Ta
*Assistant Examiner*—Roger Pang
*Attorney, Agent, or Firm*—Laura C. Wideman; Michael J. Bridges

[57] ABSTRACT

An electro-hydraulic transmission control has a pair of solenoid valves which are energized individually to provide a forward drive or a reverse drive. A mode mechanism downstream of the solenoid valves is actuated to a forward or reverse mode depending on which solenoid is actuated. The hydraulic fluid downstream of the solenoid valves is also effective to actuate one of two disable valves. When the forward solenoid is selected, the reverse disable valve is actuated and vice versa. In the event that hydraulic pressure is inadvertently directed to the forward and reverse drives simultaneously, both disable valves are actuated and the transmission control is placed in neutral.

3 Claims, 2 Drawing Sheets

ELECTRONIC TRANSMISSION RANGE SELECTION

TECHNICAL FIELD

This invention relates to transmission controls and more particularly to electronic transmission controls.

BACKGROUND OF THE INVENTION

Multi-speed power transmissions used in passenger vehicles have a plurality of forward ratios and a reverse ratio. These transmissions have controls including a range selection mechanism. A majority of these transmissions utilize a manual selector valve which is controlled by the operator through a mechanical linkage or flexible transmitter. The manual selector valve prevents the simultaneous selection of forward and reverse by exhausting the circuit not selected.

The mechanical systems, linkages and/or flexible transmitters, both require routing space between the operator and the transmission. This space is being reduced and the routing of the mechanical system is becoming difficult. To alleviate this design constraint, it has been proposed in some transmission assemblies to use electronic controls. One such example of these devices can be seen in U.S. Pat. No. 5,228,365. This patent describes a system that prevents the simultaneous selection of a forward and reverse condition.

Other devices, such as electric motors, have been incorporated in the transmission control structure to replace the mechanical linkage system. The motor is mounted directly on the transmission case and uses the selector valve to prevent the simultaneous selection of forward and reverse. While the electric motor acts in a manner similar to the mechanical systems, it does not have the same space limitations. However, sufficient space to mount the motor on the transmission case is required.

SUMMARY OF THE INVENTION

It is an object of the present invention to provide an improved electronic transmission control to prevent simultaneous actuation of inconsistent drive conditions.

In one aspect of the present invention, an electronic control with a mode control mechanism having a single mode valve is effective to prevent the simultaneous pressurization of both a forward drive circuit and a reverse circuit. In another aspect of the present invention, the mode control mechanism has two mode valves effective to prevent the simultaneous pressurization of a forward circuit and a reverse circuit.

In yet another aspect of the present invention, a pair of solenoid valves are operable to actuate the mode control mechanism. In still another aspect of the present invention, drive disabling valves are disposed downstream of the mode control mechanism and the solenoid valves to effect proper distribution of hydraulic fluid to permit actuation of one circuit and to disable actuation of the other circuit.

In a further aspect of the present invention, the reverse solenoid valve is effective, when energized, to actuate the mode control mechanism to the reverse position and to actuate a forward disable valve to the forward disable position. In a yet further aspect of the present invention, the forward solenoid valve is effective, when energized, to actuate the mode control mechanism to the forward drive position and to actuate a reverse disable valve to a reverse disable position.

In a still further aspect of the present invention, the disable valves will prevent actuation of both the forward drive circuit and the reverse circuit if the control inadvertently attempts to energize the forward and reverse circuits simultaneously.

DESCRIPTION OF EXEMPLARY EMBODIMENTS

Figure 1:
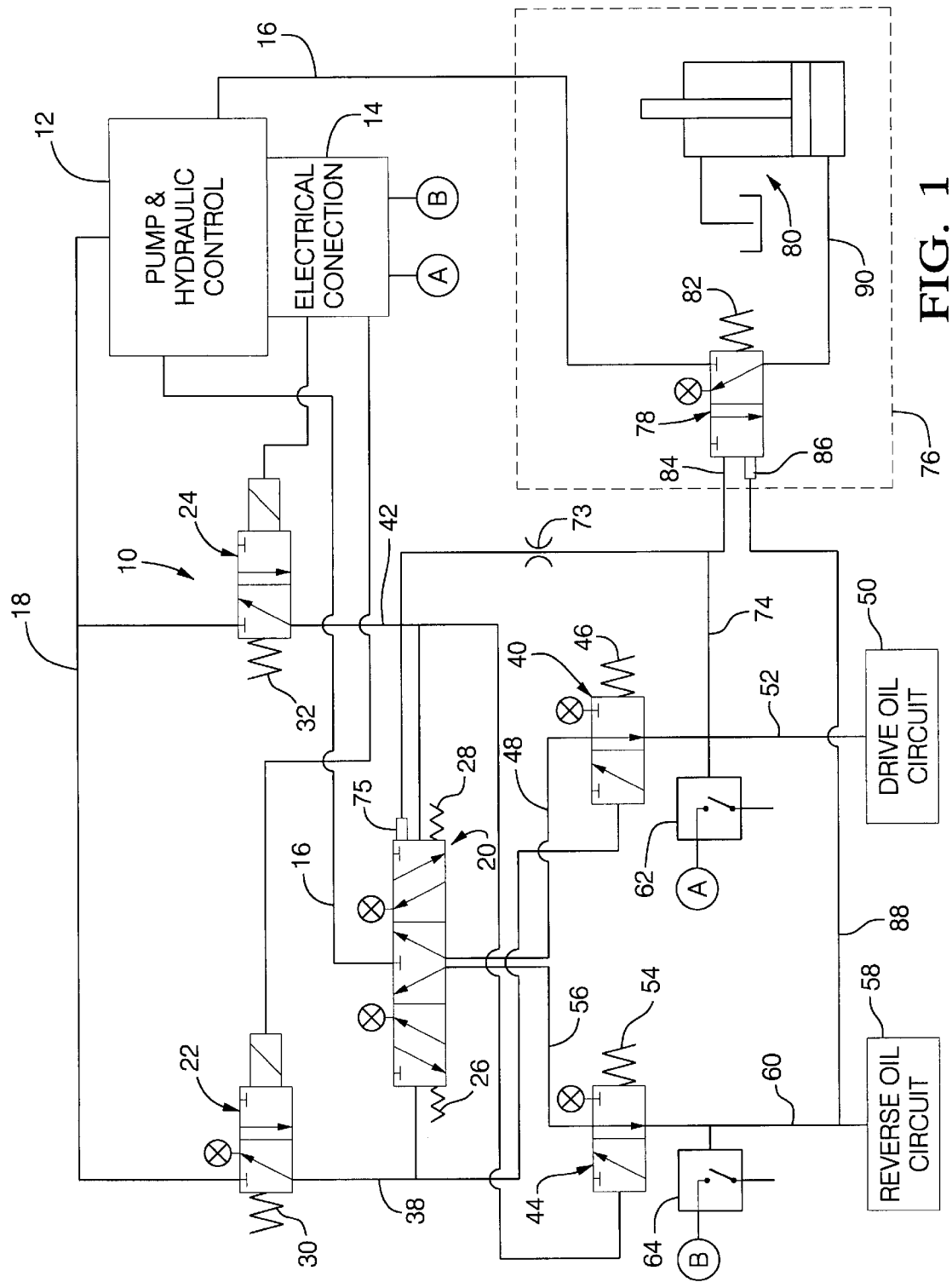
FIG. 1 is a schematic representation of an electro-hydraulic control incorporating one embodiment of the present invention.

Referring to the drawings, there is seen in FIG. 1 an electro-hydraulic transmission control system 10. The system 10 has a positive displacement pump and hydraulic control 12. The components contained in the pump and control 12 are conventional hydraulic devices well known in the art of transmission controls. Included in the hydraulic control portion 12 are such elements as a pressure regulator valve, shift valves, a governor valve and a throttle valve. Any or all of these valves may have a solenoid associated therewith. These solenoids, as well as others to be discussed later, are controlled by a conventional electronic control 14.

The control 12 provides a main or line pressure hydraulic fluid in a main passage 16 and a solenoid supply pressure fluid in a solenoid feed passage 18. The main passage is in communication with a mode valve 20, and the solenoid supply passage is in communication with a reverse solenoid valve 22 and a drive solenoid valve 24. The mode valve 20 is a three position valve which is urged to the center or neutral position shown by a pair of springs 26, 28. The solenoid valves 22 and 24 are two position valves which are urged toward their respective spring set positions shown by a spring 30 and a spring 32, respectively. The solenoid valve 22, when energized by the control 14, will urge the valve 22 against the spring 30 to a solenoid set position. The solenoid valve 24, when energized by the control 14, will urge the valve 24 against the spring 32 to a solenoid set position.

In the spring set position shown, the valve 22 prevents the flow of hydraulic fluid from the passage 18 to a reverse control signal passage 38 which communicates with the mode valve 20 and a drive disable valve 40. In the spring set position shown, the valve 24 prevents the flow of hydraulic fluid from the passage 18 to a drive control signal passage 42 which communicates with the mode valve 20 and a reverse disable valve 44. When either valve 22 or 24 is placed in the solenoid set position, the mode valve 20 will be urged to an associated pressure position by the fluid pressure in the respective passages 38 or 42. If both passages 38 and 42 are pressurized, the mode valve 20 will be placed in the spring set position shown.

The drive disable valve 40 is a two position valve which is urged to a spring set position shown by a spring 46. The valve 40 is urged to a pressure set position by fluid pressure in the passage 38 when the valve 22 is placed in the solenoid set position. The valve 40 is operable in the spring set position to communicate fluid in a feed passage 48 to a forward drive circuit 50 through a drive control passage 52. The forward drive circuit 50 is included, at least partially, in the control 12. Generally, the forward drive circuit 50 will include one or more conventional fluid-operated, selectively engageable torque transmitting devices. The transmission requires that the forward drive circuit 50 be pressurized whenever a forward drive is selected by the operator. The passage 48 communicates fluid between the mode valve 20 and the drive disable valve 40. When the mode valve 20 is in the spring set position or in a pressure set position by fluid in passage 38, the feed passage 48 will be exhausted to a transmission sump, not shown. When the valve 40 is in the pressure set position by fluid in the passage 38, the control passage 52 will be exhausted through the valve 40.

The reverse disable valve 44 is a two position valve which is urged to a spring set position shown by a spring 54. The valve 44 is urged to a pressure set position by fluid pressure in the passage 42 when the valve 24 is placed in the solenoid set position. The valve 44 is operable in the spring set position to communicate fluid in a feed passage 56 to a reverse circuit 58 through a reverse control passage 60. The reverse circuit 58 is a member in the automatic transmission. The transmission requires that the reverse circuit 58 be engaged whenever a reverse drive is selected by the operator. The passage 56 communicates fluid between the mode valve 20 and the reverse disable valve 44. When the mode valve 20 is in the spring set position or in a pressure set position by fluid in passage 42, the feed passage 56 will be exhausted to the transmission sump. When the valve 44 is in the pressure set position by fluid in the passage 42, the control passage 60 will be exhausted through the valve 44.

When the operator selects a forward drive, the drive solenoid valve 24 is energized such that the passage 18 is connected with the passage 42, and both the mode valve 20 and reverse disable valve 44 are urged to the pressure set positions. Main fluid pressure in the passage 16 is directed through the mode valve 20 to the drive disable valve 40 through the passage 48. Since the passage 38 is exhausted through the valve 22, the drive disable valve 40 is in the spring set position such that pressurized fluid in passage 48 is directed through passage 52 to the forward drive circuit 50. A pressure switch 62 is responsive to the pressure in passage 52 to cause a signal to be given to the electronic control 14. This will inform the central processing unit in the control 14 that actuation of the forward circuit has been achieved. When the operator selects the reverse drive, the solenoid 22 is energized and the valve 22 is moved to the solenoid set position. This action communicates the pressurized fluid in the passage 18 to be directed to the mode valve 20 and the drive disable valve 40 such that both valves 20 and 40 will be moved to the pressure set positions. Fluid pressure in the main passage 16 will be directed by the mode valve 20 to the passage 56. The fluid in passage 56 is directed through the valve 44 to the reverse circuit 58. A pressure switch 64 is responsive to the pressure in the passage 60 to inform the control 14 that actuation of the reverse circuit has been achieved.

If the reverse solenoid valve should happen to be in the solenoid set position when the operator selects the drive solenoid, the mode valve 20 will be placed in the spring set position and both disable valves 40 and 44 will be placed in the pressure set position. This will prevent the engagement of either of the circuits 50 or 58. Thus, a neutral condition will be achieved to inform the operator of the malfunction. This prevents the simultaneous selection of both circuits 50 and 58 if either of the valves 22 or 24 are inadvertently placed or maintained in the solenoid set position.

Figure 2:
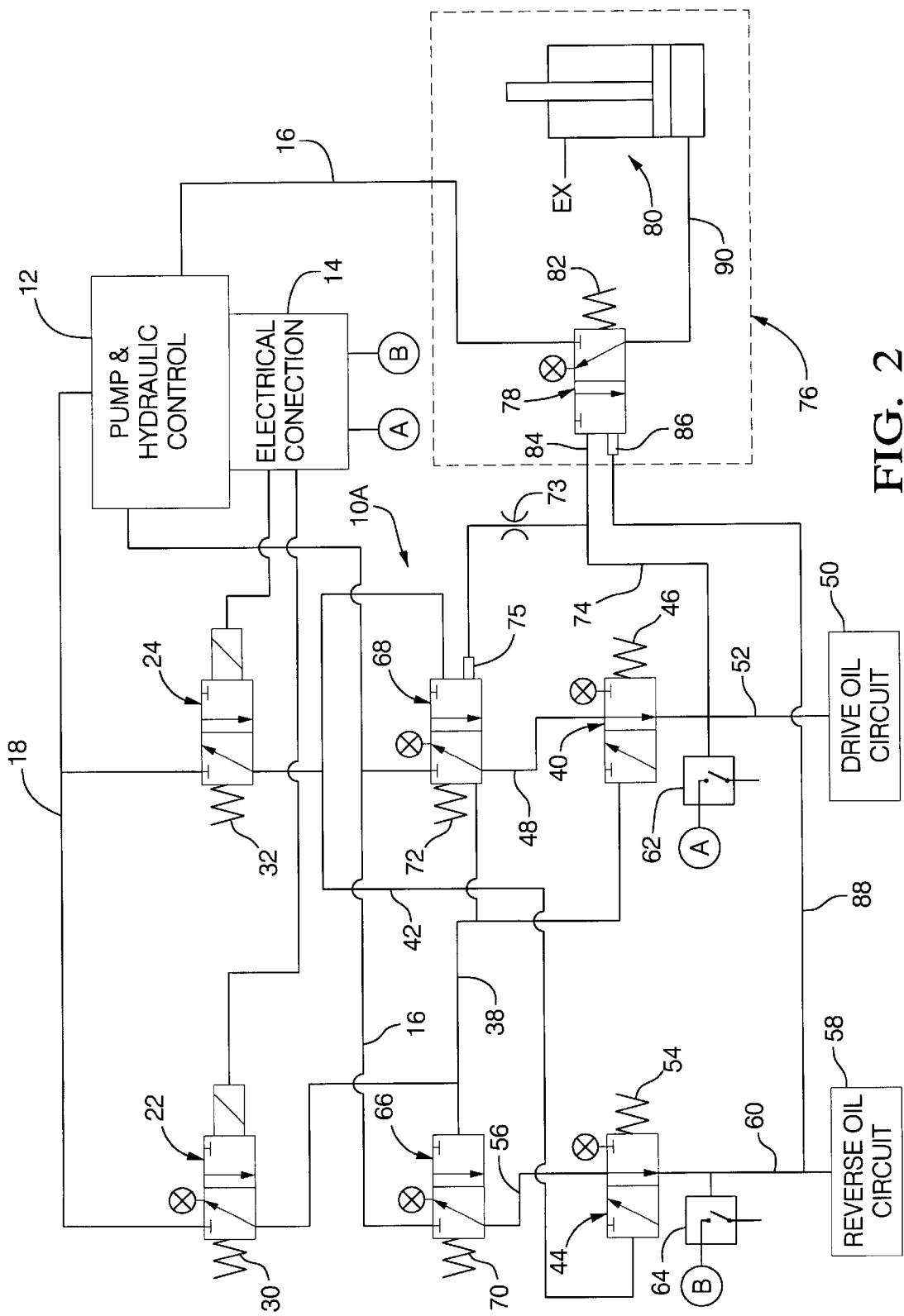
FIG. 2 is a schematic representation of an electro-hydraulic control incorporating another embodiment of the present invention.

The electro-hydraulic control system 10A shown in FIG. 2 is similar in operation to the system 10 of FIG. 1. The major difference between the systems 10A and 10 is the mode valve structure. In FIG. 1, the mode valve 20 is a single valve having three positions. In FIG. 2, a reverse mode valve 66 and a drive mode valve 68 are used.

The reverse mode valve 66 is a two-position valve which is urged to a spring set position by a spring 70 and to a pressure set position by pressure in the passage 38. The drive mode valve 68 is a two-position valve which is urged to a spring set position by a spring 72 and to a pressure set position by fluid pressure in the passage 42.

In the spring set position, the valve 66 exhausts the feed passage 56. Therefore, regardless of the position of the disable valve 44, the reverse circuit 58 will be exhausted. When the mode valve 68 is in the spring set position, the forward drive circuit 50 is exhausted regardless of the position of the disable valve 40.

When the reverse drive is selected by the operator, the solenoid valve 22 is energized such that pressurized fluid in the passage 38 will urge both the reverse mode valve 66 and the drive disable valve 40 to the pressure set positions and the drive mode valve 68 to the spring set position. This will permit engagement of the reverse circuit 58 and disengagement of the forward drive circuit 50. When forward drive is selected by the operator, the solenoid valve 24 is energized to cause the distribution of pressurized fluid to the passage 42. This results in the drive mode valve 68 and the reverse disable valve 44 being urged to their respective pressure set positions and the forward drive circuit 50 will be engaged while the reverse circuit 58 is exhausted through the valve 44.

Should both of the solenoid valves be held in the energized position, both of the mode valves 66, 68 will be urged to the pressure set positions and both disable valves 40, 44 will be urged to the pressure set positions. The reverse circuit 58 will be exhausted through the valve 44 and the forward drive circuit 50 will be exhausted through the valve 40, thus preventing simultaneous engagement of the circuits 50 and 58.

The drive control passage 52, in both electro-hydraulic control system 10 and 10A, communicates with a passage 74 which supplies a control oil through a restriction 73 to a pressure control port 75 at the mode valve 20, in the control system 10, or at mode valve 68, in the control system 10A. The control oil in passage 74 will latch the respective mode valves 20 and 68 in the drive position. When the drive position has been achieved, any inadvertent discontinuance of electrical power will not prevent vehicle operation because of the latching condition. Thus, forward drive will be available until the vehicle operation is discontinued and the engine is stopped or reverse drive is enabled. Should the latching feature be redundant or unnecessary, the restriction 73 can be plugged.

The passage 74 also communicates with a park release mechanism 76. The park release mechanism 76 has a control valve 78 and a release servo actuator 80. The actuator 80 assists in the release of a conventional park mechanism, not shown. Park mechanisms are well known and have been used for many years in automatic transmissions.

The control valve 78 is a two-position directional control valve which includes a spring 82 and a pair of pressure control ports 84, 86. The port 84 is in fluid communication with the passage 74, and the port 86 is in fluid communication with the passage 60 through a passage 88. The valve 78 is fluidly connected with the actuator 80 through a passage 90. In the spring set position shown, the valve 78 is effective to exhaust the passage 90 such that the park mechanism can be engaged by the operator if desired. When the valve 78 is in the pressure set position, i.e., fluid pressure in passage 74 or 88, the main passage 16 is communicated to the passage 90 and the release servo actuator 80 will be actuated to assist in releasing the park mechanism if necessary due to external loading. The pressurization of passages 74 or 88 also ensures that the park mechanism is released whenever a forward or reverse drive is selected.

From the foregoing disclosure, it should be evident that the electro-hydraulic control systems 10 and 10A control the state of transmission range selection through the selective actuation of the solenoid valves 22 and 24. The control systems 10 and 10A provide two hydraulic pressure outputs—reverse oil to enable a reverse function and drive oil to enable a forward drive function. The two electrical switches 62 and 64 provide feedback to the control 14 to assist in determining if the requested operation is undertaken. The system also has the capability of ensuring release of a vehicle park mechanism.

The control system 10 or 10A has four states that can occur:

1. Park/Neutral (the control does not differentiate hydraulically between these states)
2. Drive (forward gear states)
3. Reverse
4. Diagnostic Neutral.

In the Park/Neutral state, both solenoid valves 22, 24 are in the spring set position and the mode valves 20, or 66 and 68 are effective to exhaust the circuits 50 and 58. The park release valve is in the default state which places the park release servo actuator 80 in the retracted position to permit the engagement of the park mechanism if desired. The switches 62, 64 are positioned such that the control 14 is aware of the Neutral/Park condition.

When the Drive state is requested, the drive solenoid 24 is actuated and the reverse solenoid 22 is spring set. The hydraulic fluid in passage 42 shifts the mode valve 20 or 68 to the pressure set position and the valve 44 to the disable position. This permits pressurized hydraulic fluid to flow through the mode valve 20 or 68 and to enter the drive circuit 50 and the park release mechanism 76 to extend the actuator 80. The oil in passage 52 is also distributed to the mode valve 20 or 68 to latch the control in the Drive state. The switch 62 is actuated to inform the control 14 that the drive circuit 52 is pressurized.

When the Reverse state is requested, the reverse solenoid 22 is actuated and the drive solenoid valve 24 is urged to the spring set position. The oil in passage 38 shifts the mode valve 20 or 66 to the reverse position and the drive disable valve 40 to the pressure set position. The valve 20 or 66 will direct pressurized oil in passage 16 to the reverse disable valve 44 and therethrough to the reverse circuit 58 and the park release mechanism 76. The switch 64 is actuated to inform the control 14 that the reverse circuit 58 is pressurized.

Diagnostic Neutral occurs when the passage 52 is pressurized (switch 62 actuated) and forward drive has not been selected or the passage 60 is pressurized (switch 64 actuated) and reverse has not been selected. When the control 14 senses this state, the control 14 will place the transmission in the Diagnostic Neutral condition by actuating both solenoid valves 22 and 24 simultaneously. Such action will actuate both disable valves 40 and 44 and therefore exhaust both circuits 50 and 58. The park release mechanism 78 is unpressurized such that park can be selected by the operator.

The following truth table displays the state of the solenoid valves 22, 24 during the various operating states with the numeral 1 indicating actuation and the numeral 0 indicating spring set.

|  | Valve 22 | Valve 24 |
| --- | --- | --- |
| Park/Neutral | 0 | 0 |
| Reverse | 1 | 0 |
| Drive | 0 | 1 |
| Diagnostic Neutral | 1 | 1 |

What is claimed is:

1. A transmission control for a transmission having a drive circuit and a reverse circuit, said control comprising:

a selectively energizable forward solenoid valve;

a selectively energizable reverse solenoid valve;

a forward disable valve means for controlling pressure distribution to said drive circuit;

a reverse disable valve means for controlling pressure distribution to said reverse circuit;

a single mode valve element having a forward drive circuit position, a reverse drive circuit position and a neutral circuit position, said mode valve element being selectively disposed in fluid flow relation between a pressure source and both said forward disable valve means and said reverse disable valve means for distributing fluid from said source to said disable valve means in response to being positioned by said solenoid valve means;

said forward disable valve means being operable to exhaust said drive circuit in response to a signal from said reverse solenoid valve, said reverse disable valve means being operable to exhaust said reverse circuit in response to a signal from said forward solenoid valve, and said forward and reverse disable valve means cooperating to prevent the simultaneous engagement of said drive circuit and said reverse circuit; and a latching passage communicating fluid pressure in said drive circuit from downstream of said forward disable valve means to said mode valve element to prevent a state change thereof unless commanded by an operator.

2. A transmission control for a transmission having a drive circuit and a reverse circuit, said control comprising:

a selectively energizable forward solenoid valve means for distributing a forward control signal in response to a drive state commanded by an operator;

a selectively energizable reverse solenoid valve means for distributing a reverse control signal in response to a reverse state commanded by the operator;

a forward disable valve means for controlling pressure distribution to the drive circuit in response to said forward control signal;

a reverse disable valve means for controlling pressure distribution to the reverse circuit in response to said reverse control signal;

mode valve means disposed in fluid flow relation between a pressure source and both said forward disable valve means and said reverse disable valve means for distributing fluid from said source to said forward disable valve means in response to said reverse control signal and to said reverse disable valve means in response to said forward control signal;

said forward disable valve means being operable to exhaust the drive circuit in response to said reverse control signal from said reverse solenoid valve means, said reverse disable valve means being operable to exhaust the reverse circuit in response to said forward control signal from said forward solenoid valve means, and said forward and reverse disable valve means cooperating to prevent the simultaneous engagement of the drive circuit and the reverse circuit when said forward and reverse control signals are present simultaneously; and a latching passage communicating fluid pressure in said drive circuit from downstream of said forward disable valve means to said mode valve means to prevent a state change thereof when a forward control signal is selected unless commanded by the operator.

3. The transmission control defined in claim 2 further comprising: a park mechanism in the transmission; a park release mechanism; and passage means from both said drive circuit and said reverse circuit to said park release mechanism to initiate release of the park mechanism when fluid pressure is present in either of said drive circuit and said reverse circuit.

* * * * *